(12) United States Patent
Oyane et al.

(10) Patent No.: US 8,670,767 B2
(45) Date of Patent: Mar. 11, 2014

(54) RADIO BASE STATION APPARATUS CONFIGURED TO MODIFY A SOFTER HANDOVER ENABLED RANGE

(75) Inventors: Hidehiko Oyane, Kanagawa (JP); Daisuke Tanigawa, Kanagawa (JP); Akihiro Hikuma, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 373 days.

(21) Appl. No.: 13/059,287

(22) PCT Filed: Aug. 21, 2009

(86) PCT No.: PCT/JP2009/064621
§ 371 (c)(1),
(2), (4) Date: Mar. 18, 2011

(87) PCT Pub. No.: WO2010/021371
PCT Pub. Date: Feb. 25, 2010

(65) Prior Publication Data
US 2011/0183677 A1    Jul. 28, 2011

(30) Foreign Application Priority Data
Aug. 22, 2008    (JP) .................................. 2008-213524

(51) Int. Cl.
*H04W 36/00*    (2009.01)
(52) U.S. Cl.
USPC ............... 455/442; 455/7; 455/418; 455/420; 455/436; 455/450; 370/331
(58) Field of Classification Search
USPC ................ 455/522, 550.1, 553.1, 561, 562.1, 455/7–11.1, 14–25, 436–444, 422.1, 455/450–455, 464, 509, 418–420; 370/321–337, 339, 341–348, 431–463
See application file for complete search history.

(56) References Cited

U.S. PATENT DOCUMENTS

| | | | |
|---|---|---|---|
| 5,822,698 A * | 10/1998 | Tang et al. | 455/447 |
| 6,049,717 A * | 4/2000 | Dufour et al. | 455/446 |
| 6,477,154 B1 * | 11/2002 | Cheong et al. | 370/328 |
| 2004/0229603 A1 * | 11/2004 | Sato et al. | 455/422.1 |
| 2005/0070287 A1 * | 3/2005 | Cave et al. | 455/436 |

FOREIGN PATENT DOCUMENTS

| | | |
|---|---|---|
| JP | 2001-061175 | 3/2001 |
| JP | 2001-519635 | 10/2001 |
| JP | 2002-369244 | 12/2002 |
| JP | 2004-236341 | 8/2004 |
| JP | 2005-223661 | 8/2005 |
| JP | 2007-104037 | 4/2007 |
| JP | 2007-509532 | 4/2007 |
| JP | 2007-166353 | 6/2007 |

* cited by examiner

*Primary Examiner* — Ronald Eisner
(74) *Attorney, Agent, or Firm* — MKG, LLC

(57) ABSTRACT

The present invention provides a radio base station apparatus that is capable of freely expanding an area, improving the degree of freedom in designing of the area significantly and reducing the equipment investment. The radio base station apparatus includes: a plurality of transmission/reception units which are remotely installed in a service area and to which necessary numbers of carriers and sectors are assigned in accordance with the respective installation areas; a modulation/demodulation unit which can set/modify the soft handover enabled range and modulates/demodulates a signal transmitted/received to/from the transmission reception units; and a selector switch which is connected to the transmission/reception units remotely installed in the service area via cables so as to select connections between the modulation/demodulation unit and the transmission/reception units.

7 Claims, 9 Drawing Sheets

DEVICE STRUCTURE

(a)

SERVICE AREA

(b)

RADIO BASE STATION APPARATUS CONFIGURED TO MODIFY A SOFTER HANDOVER ENABLED RANGE

TECHNICAL FIELD

The present invention relates to a radio base station apparatus for establishing a service area covering a plurality of sectors, and particularly to a radio base station apparatus that is able to expand the area with an optical feeder.

BACKGROUND

In the conventional art, a radio base station apparatus having a base station modulation/demodulation unit combined with a transmission/reception amplifier has become mainstream, and such a radio base station apparatus is centered in plural sectors thereby to establish a service area. The radio base station apparatus illustrated in FIG. 8(a) is located at the center of the service area, and the service area centering on the radio base station apparatus is divided into the plural sectors as illustrated in FIG. 8(b) (six sectors are shown in the figure). As illustrated in FIG. 8(c), in each sector, plural-carrier signals are multiplexed (four carriers are shown in the figure). The radio base station apparatus illustrated in FIG. 8 has a capacity of twenty-four cells configured of six sectors and four carriers, and a mobile terminal in communication within the service area is managed with use of a management unit identified by a sector number and a carrier number. Inter-sector soft handover (softer handover) is performed on a mobile terminal that moves from one sector to another within the service area.

Recently, for the purposes of use in an area such as underground where radio waves do not propagate well, economical designing of a service area in a rural area and the like, a device (Optical Feeder Transmitter and Receiver: OF-TRX) equipped with a radio transceiver and a transmission/reception amplifier is deployed apart several dozen kilometers or more from a base station modulation/demodulation unit (MDE) via cable connection of an optical fiber or the like, thereby to establish the service area. FIG. 9(a) illustrates a feeder configuration of the radio base station apparatus and FIG. 9(b) is a conceptual view of the service area of feeder configuration. Only the OF-TRXs are deployed thereby to be able to establish the service area flexibly.

However, the conventional radio base station apparatus has a problem of a low degree of freedom in designing of a service area. This is because the area needs to be designed based on the fixed numbers of carriers and sectors in the design process.

In the feeder configuration, the area can be established flexibly by selecting the installed place of the optical feeder. However, as there is an upper limit to the number of sectors fixed in the design process, the area cannot be expanded with one radio base station apparatus so as to cover more sectors than the upper limit thereof. Further, as there is also an upper limit to the number of carriers per sector, it is difficult to multiplex more carriers than the upper limit thereof.

One object of the present invention is to provide a radio base station apparatus that is capable of expanding a service area flexibly, improving the degree of freedom in designing the area significantly and reducing equipment investment.

SUMMARY

The present invention is directed in one aspect to a radio base station apparatus comprising a plurality of transmission/reception units which are remotely installed in a service area and to which a required number of carriers and a required number of sectors are assigned in accordance with installed areas; a modulation/demodulation unit configured to modify a softer handover enabled range and to modulate and demodulate a signal transmitted/received from/to the transmission/reception units; and a selector switch, connected via a cable to each of the transmission/reception units remotely installed in the service area, configured to switch connections between the modulation/demodulation unit and the transmission/reception units.

According to this structure, as the modulation/demodulation unit is configured to modify the softer handover enabled range and the selector switch switches connections between the modulation/demodulation unit and the transmission/reception units, it is possible to assign a required number of carriers and a required number of sectors in accordance with each installed area to the transmission/reception units remotely installed in the service area. This makes it possible to expand the service area flexibly, improve the degree of freedom in designing the area significantly and reducing equipment investment.

Besides, the present invention can be characterized in that, in the above-described radio base station apparatus, the service area is configured to have a group of management units, each management unit is combination of sector and carrier assigned to the transmission/reception unit, in softer handover, the modulation/demodulation unit sends the signal with a designated unit number assigned to one of the management units within the softer handover enabled range, and the selector switch switches connections between the modulation/demodulation unit and the transmission/reception units based on the designated unit number designated by the modulation/demodulation unit.

With this structure, the modulation/demodulation unit may consider only the unit numbers for softer handover, and does not have to manage assignment of the numbers of sectors and carriers to the respective transmission/reception units.

Further, the present invention can be characterized in that, in the above-described radio base station apparatus, the selector switch collects information relating to a transmission frequency band, the sectors and the carriers assigned to the transmission/reception units through communications with the transmission/reception units and forms a management unit structure of the service area from the collected information to determine the softer handover enabled range.

With this structure, it is possible to determine the softer handover enabled range by collecting the information relating to the transmission frequency bands, sectors and carriers from the transmission/reception units actually developed flexibly in the area. This makes it possible to improve the degree of freedom in designing the area more, as compared with the case where the softer handover enabled range and the cell structure are fixed in the modulation/demodulation unit.

Furthermore, in the above-described radio base station apparatus, the modulation/demodulation unit can receive information relating to the softer handover enabled range and a management unit structure of the service area from the selector switch.

Still furthermore, in the above-described radio base station apparatus, the modulation/demodulation unit can notify information of transmission power of a signal transmitted from the transmission/reception units as a relative value to maximum transmission power thereof, and the transmission/reception unit can determine the transmission power using the notified relative value relative to the maximum transmission power.

The present invention further provides a method for switching a structure of a service area, comprising the steps of: assigning a required number of carriers and a required number of sectors to transmission/reception units remotely installed in the service area in accordance with installed areas; determining a softer handover enabled range based on the number of sectors and the number of carriers assigned to the transmission/reception units and setting the softer handover enabled range at a modulation/demodulation unit; and using a selector switch installed between the modulation/demodulation unit and the transmission/reception units to switch connections between the modulation/demodulation unit and the transmission/reception units.

TECHNICAL ADVANTAGE OF THE INVENTION

According to the present invention, it becomes possible to expand the service area flexibly, improve the freedom in designing of the area significantly, and achieve reduction in equipment investment.

DETAILED DESCRIPTION

With reference to the attached drawings, an embodiment of the present invention will be described in detail below.

Figure 1:
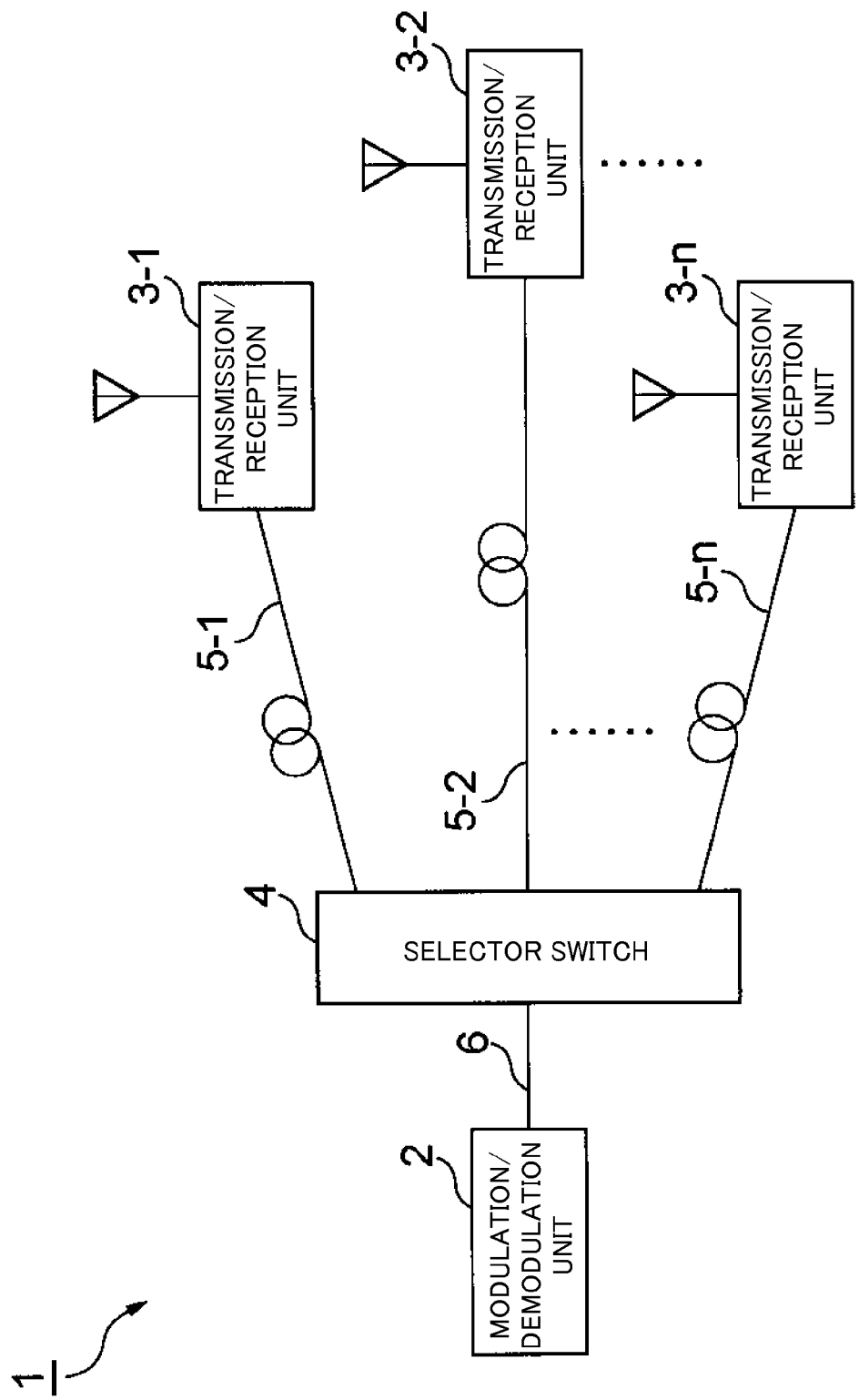
FIG. 1 is a structural view of a radio base station apparatus according to an embodiment of the present invention.

FIG. 1 is a structural view of a radio base station apparatus according to an embodiment of the present invention.

The radio base station apparatus 1 according to this embodiment is configured to include a modulation/demodulation unit 2, a plurality of transmission/reception units 3-1 to 3-n, which are optical feeders, and a selector switch 4, mainly. The selector switch 4 is provided in vicinity of the modulation/demodulation unit 2, and has optical feeder side terminals to which ends of cables 5-1 to 5-n are connected and a modulation/demodulation unit side terminal to which an end of a signal line 6 is connected. The cables 5-1 to 5-n are made of optical fibers, for example, and have lengths of up to several dozen kilometers.

The radio base station apparatus 1 of this embodiment has a capacity equivalent to the capacity of a conventional radio base station apparatus (for example, supporting 4 carriers and 6 sectors). However, as described later, the number of carriers assigned to one sector is not limited to four and the number of sectors for area expansion is not limited to six, as far as they fall within a capacity range.

Here, the service area under the control of the radio base station apparatus 1 is divided into a plurality of sectors that are developed into one plane per carrier. In each sector, plural carriers are multiplexed. Accordingly, the service area can be managed as a group of management units, each management unit is identified by combination of a sector number assigned to each sector plane-divided of the service area and a carrier number for specifying a carrier assigned to the sector. In this description, a unit number assigned to each management unit is called a cell number (CID).

The modulation/demodulation unit 2 is able to modify a softer handover enabled range, gives instructions to the transmission/reception units 3-1 to 3-n using the cell numbers and processes signals received from the transmission/reception units 3-1 to 3-n. The modulation/demodulation unit 2 manages each management unit by its cell number without consideration of the sector number and carrier number assigned to a corresponding one of the transmission/reception units 3-1 to 3-n. Therefore, it is not necessary to fix information relating to the sector numbers and carrier numbers assigned to the respective transmission/reception units 3-1 to 3-n.

The selector switch 4 assigns a transmission signal, which is given with the cell number from the modulation/demodulation unit 2, to a cable 5 connected to the transmission/reception unit to which the cell number was assigned. Besides, the selector switch 4 receives signals from the transmission/reception units 3-1 to 3-n via the cables 5-1 to 5-n and outputs them to the modulation/demodulation unit 2.

The numbers of sectors and carriers assigned to the transmission/reception units 3-1 to 3-n are not limited as far as they fall within the capacity range of the radio base station apparatus 1. Therefore, it is possible to install the transmission/reception units 3-1 to 3-n to which the carrier and sector numbers were assigned so as to optimize the capacity at each installed area, in accordance with the traffic conditions of the service area and the like.

Figure 2:
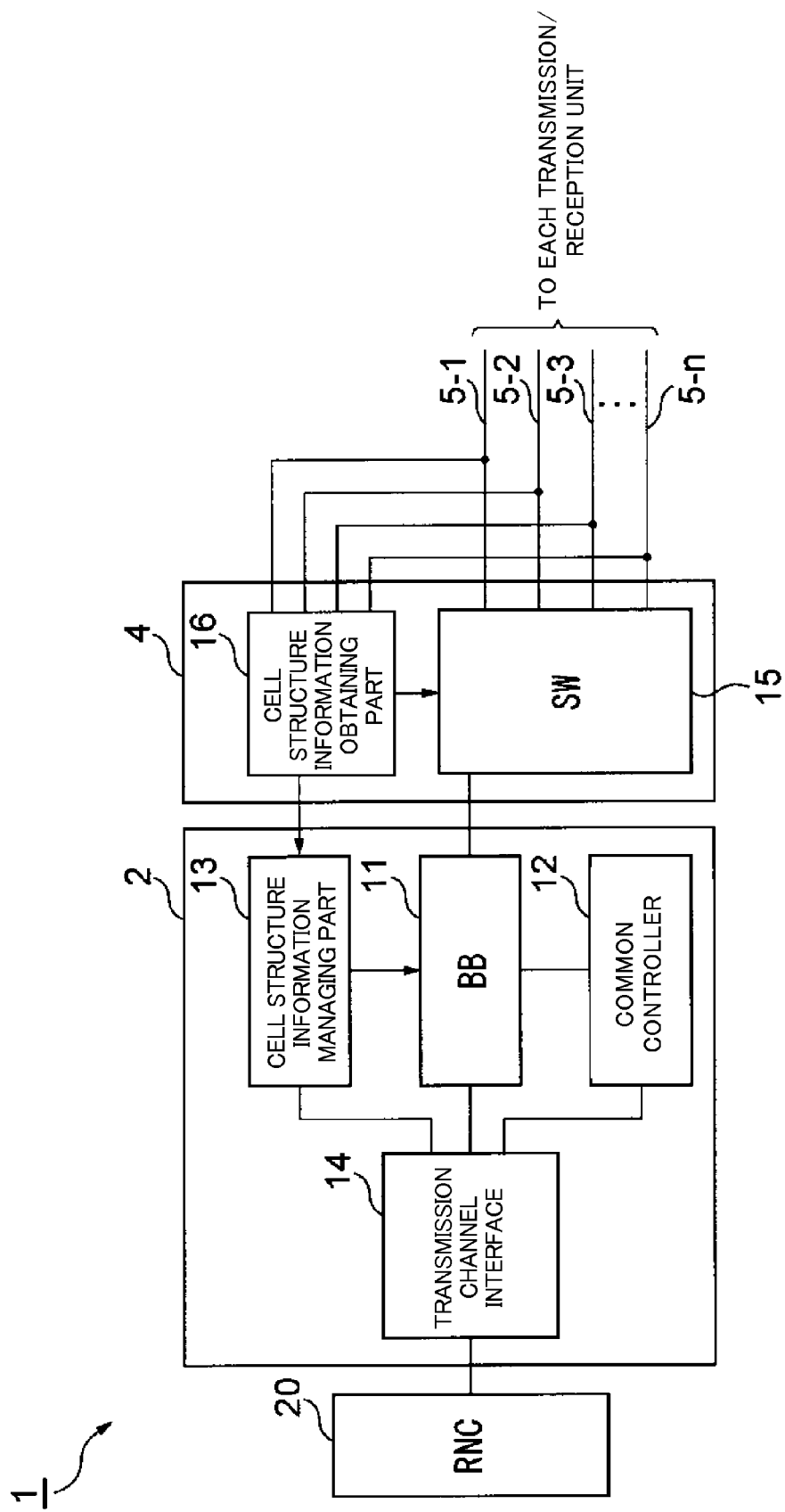
FIG. 2 is a functional block diagram of a selector switch and a modulation/demodulation unit illustrated in FIG. 1.

FIG. 2 is a functional block diagram of the modulation/demodulation unit 2 and the selector switch 4

The modulation/demodulation unit 2 has, as main component parts, a base band signal processing part 11, a common controller 12, a cell structure information managing part 13 and a transmission channel interface 14. The base band signal processing part 11 has functions of coding of transmission data, frame forming, spreading and modulation, decoding of reception data, adaptive modulation and coding (AMC), scheduling, softer handover and the like. The common controller 12 has a call proceeding control function and a monitoring control function. The cell structure information managing part 13 obtains cell structure information from the selector switch 4, sets the softer handover enabled range in the base band signal processing part 11, and notifies a radio controller 20 of the cell structure information via the transmission channel interface 14. The radio controller 20 recognizes the softer handover enabled range based on the cell structure information and gives instructions of softer handover to the base band signal processing part 11.

The selector switch 4 has a switch part 15 and a cell structure information obtaining part 16. The switch part 15 has the above-mentioned optical feeder side terminals and the modulation/demodulation unit side terminal, and is configured as a functional part to switch connections between the optical feeder side terminals and the modulation/demodulation unit side terminal. The switch part 15 controls to switch connection targets based on the cell structure information given from the cell structure information obtaining part 16. The cell structure information obtaining part 16 has a function to obtain information of transmission frequency bands, carrier and sector numbers assigned to the transmission/reception units 3-1 to 3-*n* by communication with each of the transmission/reception units 3-1 to 3-*n*. The numbers of carriers and sectors assigned to each of the transmission/reception units 3-1 to 3-*n* are used to be able to form the cell structure, and the number of sectors and transmission frequency band are used to be able to form the softer handover enabled range.

Figure 3:
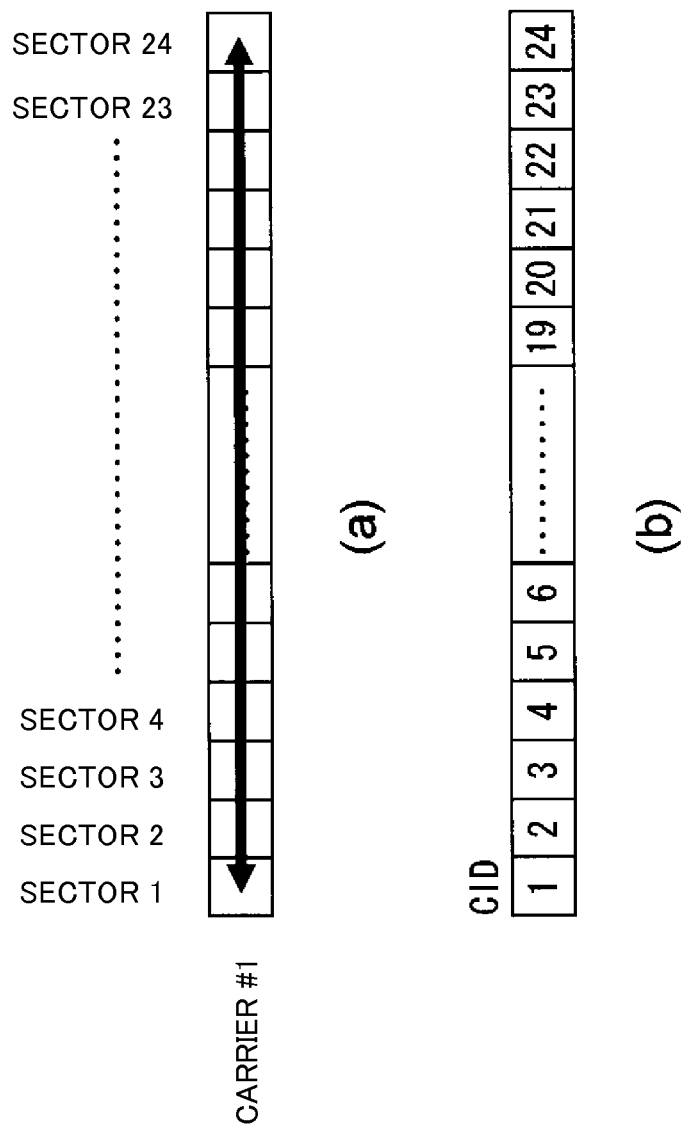
FIGS. 3(a) and 3(b) illustrate a cell structure of a service area having twenty-four sectors and one carrier and assignment of cell numbers.

FIGS. 3(*a*) to 4(*b*) are views illustrating assignment of cell numbers and cell structures of the service areas. FIG. 3(*a*) illustrates the configuration example of service area in which twenty-four transmission/reception units are allocated, each transmission/reception unit supporting 1 carrier and 1 sector. FIG. 3(*b*) illustrates the cell numbers of the cell structure having twenty-four sectors with one carrier. The successive numbers are assigned to twenty-four management units. If the twenty-four transmission/reception units are of the same transmission frequency band, the softer handover enabled range becomes of twenty-four sectors. That is, the softer handover enabled range is CID=1 to 24.

Figure 4:
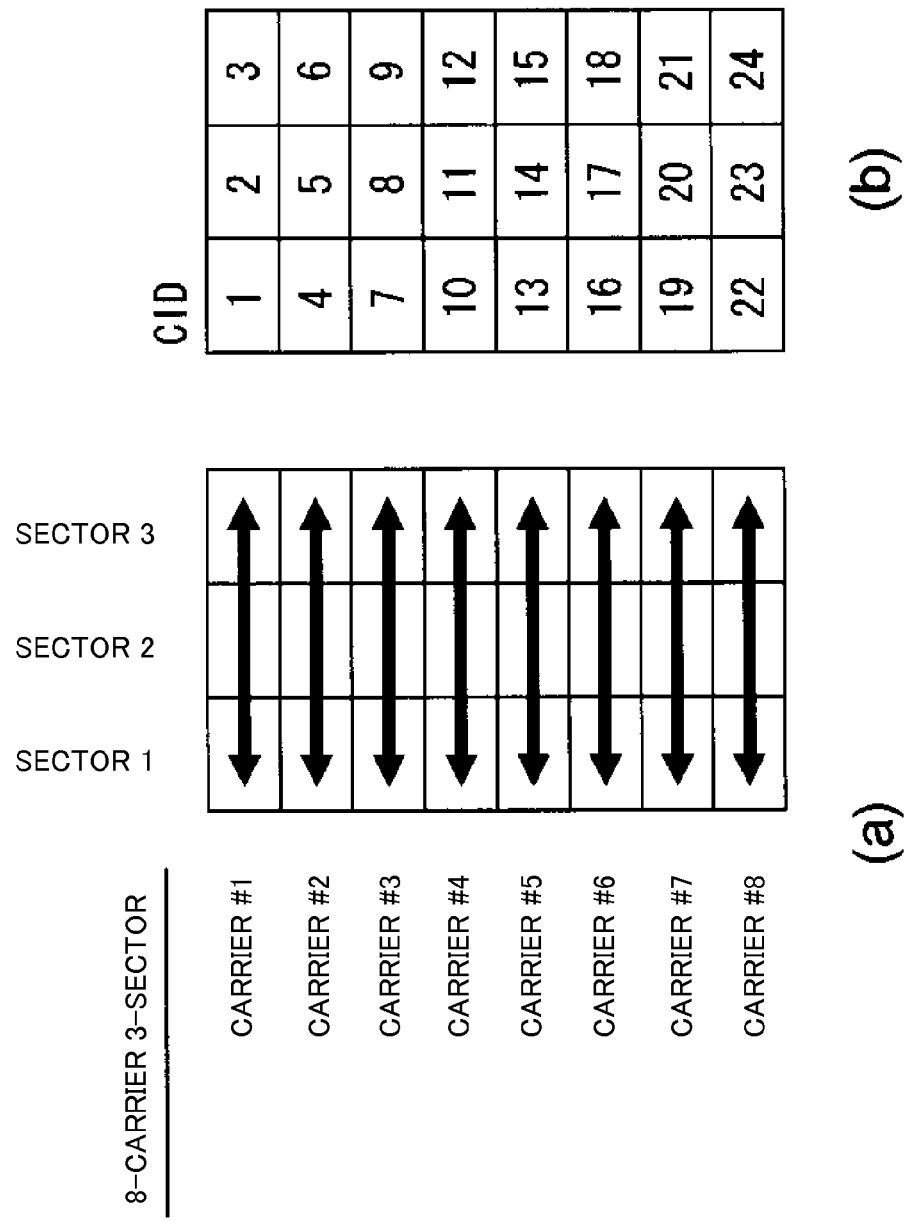
FIGS. 4(a) and 4(b) illustrate a cell structure of a service area having three sectors and eight carriers and assignment of cell numbers.

FIG. 4(*a*) illustrates configuration example of the service area in which three transmission/reception units are allocated, each transmission/reception unit supporting 8 carriers and 3 sectors. FIG. 4(*b*) illustrates the cell numbers of the cell structure having three sectors with eight carriers. If the three transmission/reception units are of the same transmission frequency band, the softer handover enabled range of the carrier #1 becomes CID=1 to 3. The softer handover enabled ranges of the carriers #2 to #8 are determined in the same manner.

Figure 5:
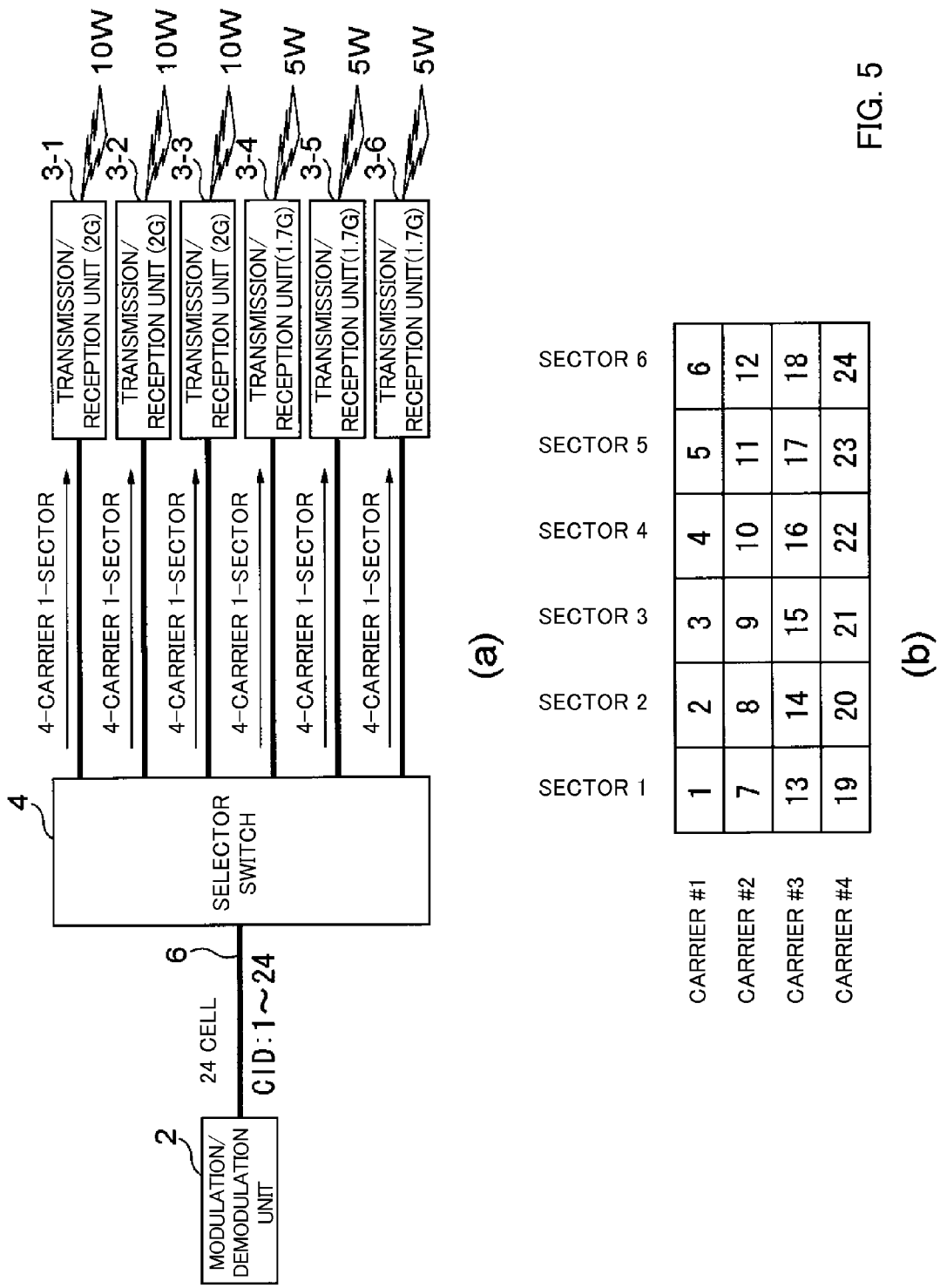
FIGS. 5(a) and 5(b) are structural views of a radio base station device corresponding to a service area having six sectors and four carriers.

Next description is made about the operation of the radio base station apparatus 1 according to the present embodiment as structure above, by way of an example of the feeder configuration illustrated in FIG. 5. In the feeder configuration as illustrated in FIG. 5(*a*), the service area is established in such a manner that six transmission/reception units 3-1 to 3-6 supporting 4 carriers and 1 sector are installed at respective places within the area. The transmission frequency bands of the transmission/reception units 3-1 to 3-3 installed in the sectors 1 to 3 are of 2 GHz, while the transmission frequency bands of the transmission/reception units 3-4 to 3-6 installed in the sectors 4 to 6 are of 1.7 GHz. In the feeder configuration illustrated in FIG. 5, the numbers of carriers and sectors assigned to the transmission/reception units 3-1 to 3-6 are the same. However, in the present invention, as assignment of the numbers of carriers and sectors is optimized in accordance with the traffic conditions of each installation place and the like, different numbers of carriers and sectors may be assigned to areas.

In the selector switch 4, the cell structure information obtaining part 16 communicates, triggered by system start, reset or the like, with the transmission/reception units 3-1 to 3-6 via the cables 5-1 to 5-6 and obtains information relating to the transmission frequency bands, sector and carrier numbers assigned to the respective transmission/reception units 3-1 to 3-6.

The cell structure information obtaining part 16 generates cell structure information, as illustrated in FIG. 5(*b*), based on the carrier and sector numbers of the transmission/reception units 3-1 to 3-6. The cell structure information includes cell numbers corresponding to each management unit. In this example, the service area is divided into six sectors, but the transmission frequency bands are different between the transmission/reception units 3-1 to 3-3 and the transmission/reception units 3-4 to 3-6. Therefore, the softer handover enabled range is of three sectors. The cell structure information obtaining part 16 generates information that defines the softer handover enabled range with the cell numbers and adds the information to the cell structure information. Specifically, the cell structure information obtaining part 16 defines the cell numbers 1 to 3, 7 to 9, 13 to 15 and 19 to 21 as the softer handover enabled ranges of the carrier numbers #1 to #4, respectively. In the same way, the cell structure information obtaining part 16 defines the cell numbers 4 to 6, 10 to 12, 16 to 18 and 22 to 24 as the softer handover enabled ranges of the carrier numbers #1 to #4, respectively.

Once the cell structure information obtaining part 16 generates the above-described cell structure information, the cell structure information obtaining part 16 sets correspondences between the transmission/reception units 3-1 to 3-6 and the cell numbers at the switch part 15. The switch part 15 uses the above-mentioned correspondences between the cell numbers and the transmission/reception units as a basis to assign transmission signals, which are given with the cell numbers from the modulation/demodulation unit 2, to corresponding cables. Further, the cell structure information obtaining part 16 notifies the modulation/demodulation unit 2 of the generated cell structure information.

In the modulation/demodulation unit 2, the cell structure information managing part 13 receives the cell structure information given from the cell structure information obtaining part 16. The cell structure information managing part 13 sets the cell structure information in the base band signal processing part 11. Consequently, the base band signal processing part 11 recognizes the softer handover enabled range with the cell numbers. The base band signal processing part 11 is configured to modify the softer handover enabled range and if the cell structure is changed by addition of another transmission/reception unit, the cell structure information managing part 13 sets a new softer handover enabled range in the base band signal processing part 11. The cell structure information managing part 13 notifies the radio controller 20, as a higher-level unit, of the cell structure information. The radio controller 20 forms the cell structure based on the cell structure information notified from the selector switch 4 via the modulation/demodulation unit 2 and uses it to control soft handover between the base stations and the like.

In this embodiment, softer handover between base stations is performed at the initiative of the radio controller 20 and softer handover between sectors is performed at the initiative of the base band signal processing part 11 of the modulation/demodulation unit 2.

When a difference in reception level between a currently communicating cell and a neighboring cell becomes a predetermined threshold or less, a mobile terminal requests the radio base station apparatus 1 to establish a new communication channel between the mobile terminal and a neighboring sector. A signal radio-transmitted from the mobile terminal is received by any of the transmission/reception units 3-1 to 3-6 which has the communication channel with the mobile terminal. Then, the signal is sent via a corresponding one of the cables 5-1 to 5-6 connected to the transmission/reception unit and the selector switch 4, and input to the base band signal processing part 11.

When receiving a request for channel connection for softer handover from the mobile terminal, the base band signal processing part 11 recognizes the softer handover enabled range from the above-mentioned cell structure information and the cell number of the current communication channel. The base band signal processing part 11 determines a sector (cell number) to connect simultaneously within the softer handover enabled range. Then, it transmits a transmission signal that designates the cell number to connect simultaneously to the switch part 15. For example, when the mobile terminal is connected to the sector 1 (cell number=1) and the sector 2 (cell number=2) simultaneously, the base band signal processing part 11 generates a transmission signal that designates the cell number=1 as the communication channel with the mobile terminal and a transmission signal that designates the cell number=2 as the communication channel with the mobile terminal and outputs the signals to the switch part 15.

The switch part 15 selects transmission/reception unit (cable) to which transmission signal is transmitted based on the cell numbers designated as a connection opponent and distributes the transmission signal to the selected transmission/reception unit. For example, for a transmission signal with the designated cell number 1, the base band signal processing part 11 is connected to the transmission/reception unit 3-1 of the sector 1 and for a transmission signal with the designated cell number 2, the base band signal processing part 11 is connected to the transmission/reception unit 3-2 of the sector 2. Receiving the transmission signals from the base bans signal processing part 11, the transmission/reception units 3-1 and 3-2 subject the signals to frequency conversion of the frequencies specified by the cell numbers and transmit the signals in radio communications.

In this way, two communication channels are established between the mobile terminal and the radio base station apparatus 1, and the mobile terminal can receive the same signal from the two transmission/reception units 3-1 and 3-2.

Besides, transmission power of a signal radio-transmitted by each of the transmission/reception units 3-1 to 3-6 is instructed by the base band signal processing part 11. The base band signal processing part 11 instructs the transmission/reception units 3-1 to 3-6 to set the transmission power of the transmission signal (IQ signal) at a relative value (%) of the maximum transmission power. For example, the maximum transmission power of the transmission/reception unit 3-1 of the sector 1 is 10 W, a transmission power instruction value of "transmission power=90%" is set at a predetermined position of a transmission format and sent to the transmission/reception unit 3-1. The transmission/reception unit 3-1 determines the transmission frequency band from the transmission format and extracts the transmission power instruction value. Then, The transmission/reception unit 3-1 determines the transmission power by an equation: 10 W×90%=9 W in which 90% is the relative value designated in the transmission power instruction value and 10 W is its own maximum transmission power, and sends the transmission signal (IQ signal).

In this way, as the base band signal processing part 11 is configured to instruct the transmission power with use of the relative value to the maximum transmission power of the transmission/reception units 3-1 to 3-6, the base band signal processing part 11 can determine the transmission power without consideration of variation of outputs of the respective transmission/reception units 3-1 to 3-6, and thereby, the processing can be simplified.

Figure 6:
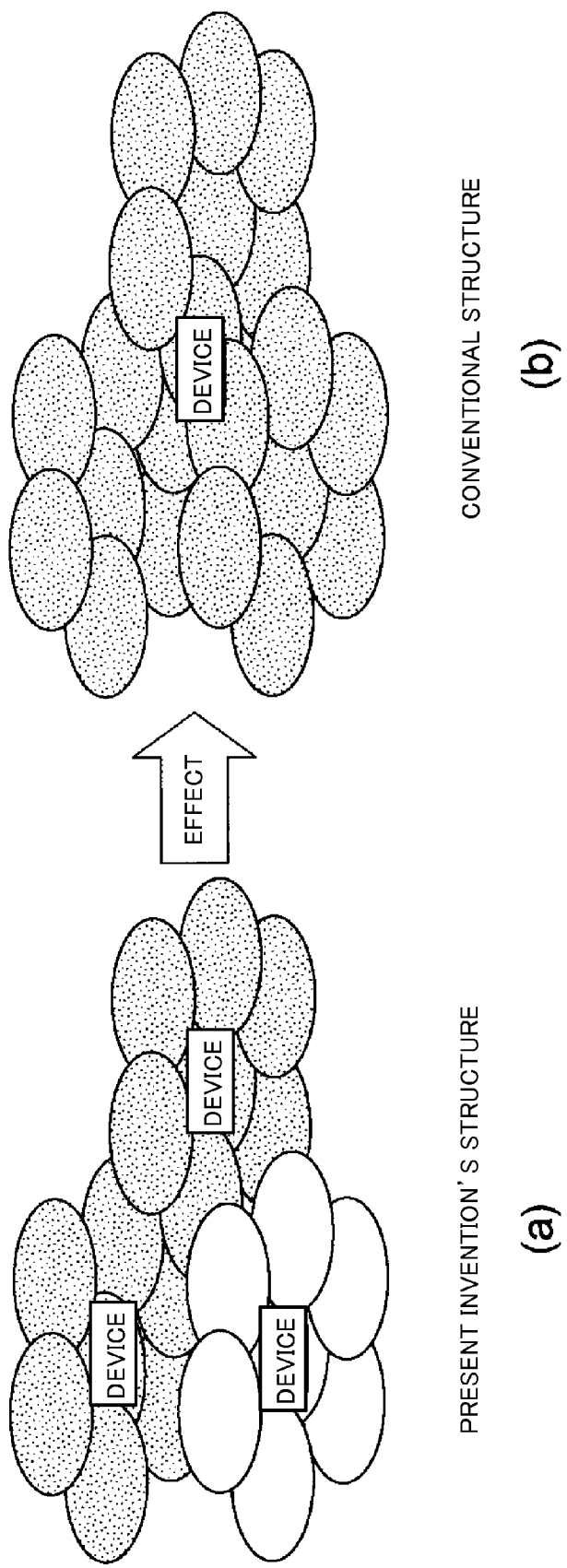
FIG. 6(a) is a view illustrating area expansion by conventional 4-carrier, 6-sector radio base station apparatuses.
FIG. 6(b) is a view illustrating area expansion by the radio base station apparatus according to the embodiment.

FIGS. 6(a) and 6(b) illustrate service areas covering twenty-four sectors. FIG. 6(a) illustrates area expansion by the conventional radio base station apparatuses supporting 4 carriers and 6 sectors and FIG. 6(b) illustrates area expansion by the radio base station apparatus 1 according to the present embodiment. In the conventional example, three radio base station apparatuses supporting 4 carriers and 6 sectors are required to realize the area expansion of twenty-four sectors. Besides, as each radio base station apparatus has capacity of twenty-four sectors, capacity of forty-eight cells (24 cells× 3−24 cells) is a surplus and the capacity cannot be used effectively. On the other hand, in the case of the radio base station apparatus 1 of the present embodiment, as the feeder configuration is adopted as illustrated in FIG. 6(a), the one radio base station apparatus having a capacity of twenty-four cells is enough to achieve area expansion of twenty-four cells. Consequently, the present invention makes it possible to reduce the two radio base station apparatuses.

Figure 7:
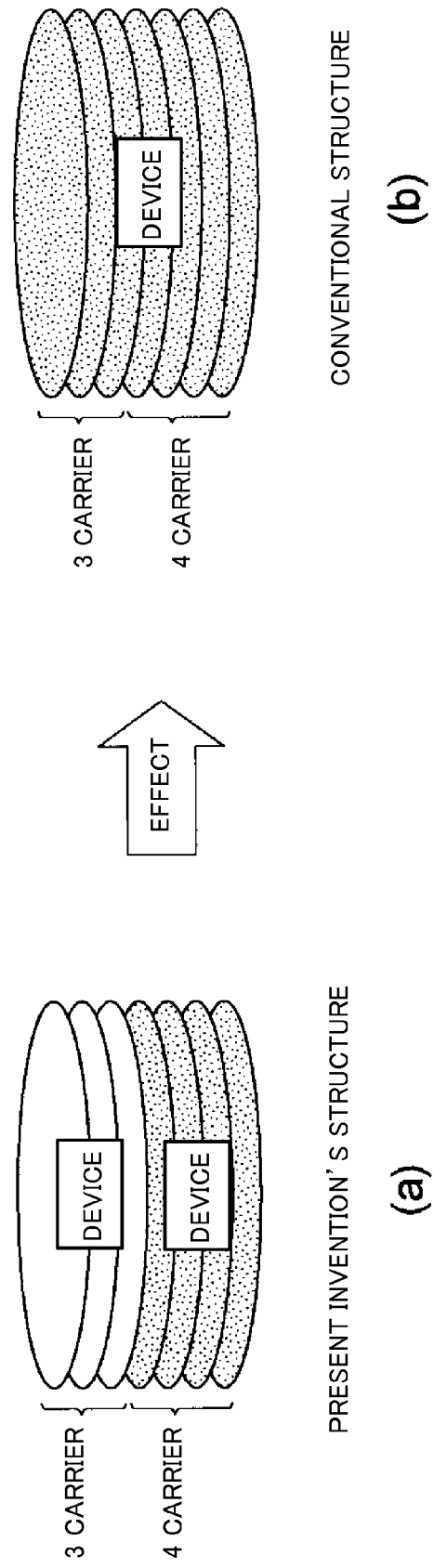
FIG. 7(a) is a conceptual view of a 1-sector, 7-carrier structure using the conventional 4-carrier, 6-sector radio base station apparatuses.
FIG. 7(b) is a conceptual view of a 1-sector, 7-carrier structure using the radio base station apparatus according to the embodiment.
Figure 8:
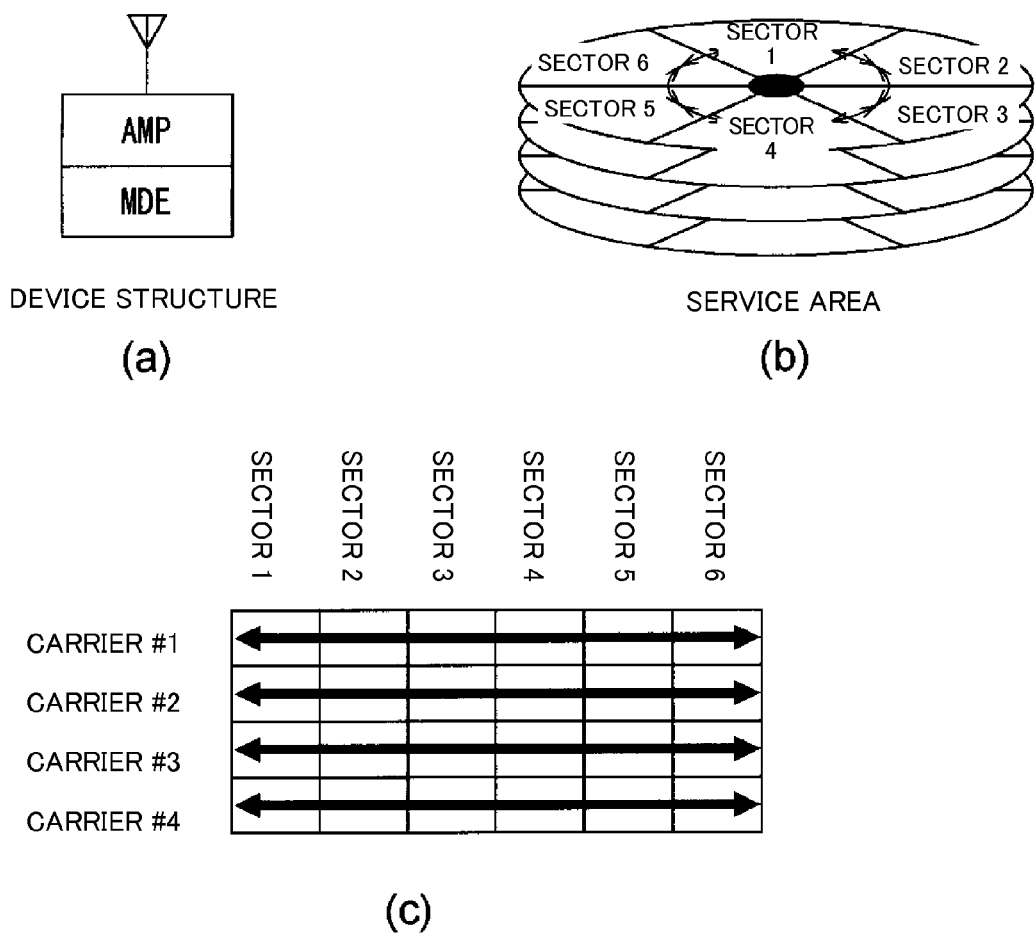
FIG. 8(a) is a structural view of a radio base station apparatus having a modulation/demodulation unit combined with a transmission/reception amplifier.
FIG. 8(b) is a view illustrating a service area divided into plural sectors with the radio base station apparatus located at the center thereof.
FIG. 8(c) is a conceptual view of a cell structure.
Figure 9:
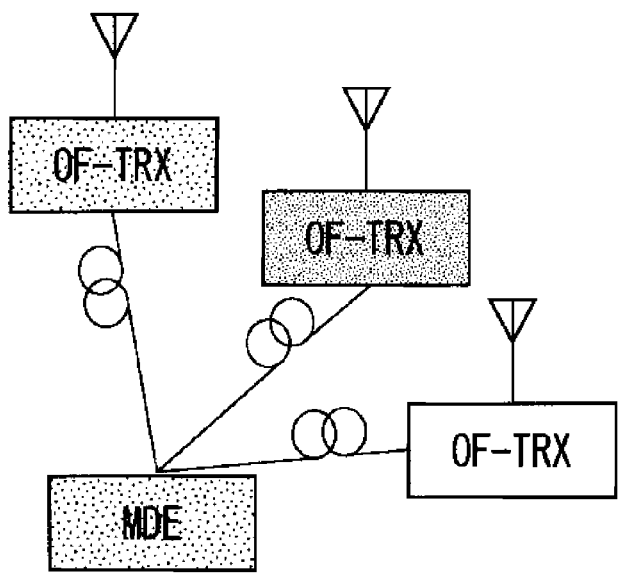
FIG. 9(a) is a structural view of a radio base station apparatus of feeder configuration.
FIG. 9(b) is a conceptual view of a service area established by the radio base station apparatus of feeder configuration.
Figure 9:
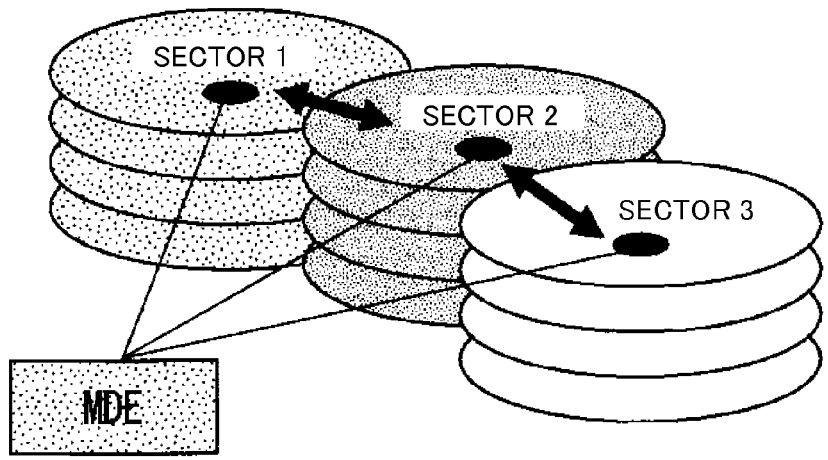

FIGS. 7(a) and 7(b) illustrate a structure of one sector with seven carriers. FIG. 7(a) illustrates an example of 4-carrier, 6-sector conventional radio base station apparatuses and FIG. 7(b) illustrates an example of the radio base station apparatus 1 according to the present embodiment. In the conventional structure, one radio base station apparatus supports only four carriers and therefore, one more radio base station apparatus supporting 4 carriers and 6 sectors is installed. In the case of the radio base station apparatus 1 according to the present embodiment, the number of carriers assigned to one sector can be set flexibly in consideration of the capacity of transmission/reception unit, and therefore, seven carriers can be assigned to one sector. Accordingly, one transmission/reception unit supporting 7 carriers and 1 sector is used enough to realize this structure. Consequently, the present invention makes it possible to reduce the installation number of radio base station apparatuses.

As described up to this point, according to the present embodiment, as the selector switch 4 is provided between the modulation/demodulation unit 2 and the transmission/reception units 3-1 to 3-n, it is possible to determine the numbers of carriers and sectors assigned to the transmission/reception units 3-1 to 3-n flexibly for area expansion, to use the capacity of the radio base station apparatus 1 as efficiently as possible and to achieve reduction in equipment investment due to reduction in number of installed base stations.

In the above description, one base band signal processing part 11 is provided, however, plural base band signal processing parts may be provided, and in such a configuration, the switch part 15 may be configured to switch connections between the plural base band signal processing parts and the plural transmission/reception units.

Industrial Applicability

The present invention is applicable to a radio base station apparatus that is able to expand the service area with optical feeders.

The invention claimed is:
1. A radio base station apparatus comprising:
a plurality of transmission/reception units which are remotely installed in a service area and to which a required number of carriers and a required number of sectors are assigned in accordance with installed areas;
a modulation/demodulation unit configured to modulate and demodulate a signal transmitted to and received from each of the transmission/reception units; and
a selector switch, connected via a cable to each of the transmission/reception units remotely installed in the service area, configured to switch connections between the modulation/demodulation unit and the transmission/reception units, wherein the service area is managed as a group of management units, each of the management units being identified by combination of a sector number of each of the sectors and a carrier number of a carrier assigned to the sector, and in softer handover, the modulation/demodulation unit is configured to modify predetermined management units according to a softer handover enabled range.

2. The radio base station apparatus of claim 1, wherein the management units are assigned with respective unit numbers which are successive numbers to identify all the management units the service area is configured to have, in softer handover, the modulation/demodulation unit sends the signal with a predetermined unit number designating from among management units that are within the softer handover enabled range, and the selector switch switches connections between the modulation/demodulation unit and the transmission/reception units based on the unit number designated by the modulation/demodulation unit.

3. The radio base station apparatus of claim 1, wherein the selector switch collects information relating to a transmission frequency band, the sectors and the carriers assigned to the transmission/reception units through communications with the transmission/reception units and forms a management unit structure of the service area from the collected information to determine management units within the softer handover enabled range.

4. The radio base station apparatus of claim 2, wherein in the softer handover, the selector switch distributes the signal output from the modulation/demodulation unit to the transmission/reception units corresponding to designated unit numbers.

5. The radio base station apparatus of claim 1, wherein the modulation/demodulation unit receives information relating to management units within the softer handover enabled range and a management unit structure of the service area from the selector switch.

6. The radio base station apparatus of claim 1, wherein the modulation/demodulation unit notifies information of transmission power of a signal transmitted from the transmission/reception unit as a relative value to maximum transmission power thereof, and the transmission/reception unit determines the transmission power using the notified relative value.

7. A method for switching a structure of a service area, comprising the steps of:

assigning a required number of carriers and a required number of sectors to transmission/reception units remotely installed in the service area in accordance with installed areas;

managing the service area as a group of management units, each of the management units being identified by combination of a sector number of each of the sectors and a carrier number of a carrier assigned to the sector;

determining management units as within a softer handover enabled range based on the number of sectors and the number of carriers assigned to the transmission/reception units and setting the softer handover enabled range at a modulation/demodulation unit; and using a selector switch installed between the modulation/demodulation unit and the transmission/reception units to switch connections between the modulation/demodulation unit and the transmission/reception units.

* * * * *